US010668699B2

(12) United States Patent
Moller et al.

(10) Patent No.: US 10,668,699 B2
(45) Date of Patent: Jun. 2, 2020

(54) MULTILAYER COMPOSITE HAVING CORRUGATED WOODEN ELEMENTS

(71) Applicant: Wood Innovations Ltd., Eschen (LI)

(72) Inventors: Achim Moller, Dresden (DE); Thomas Eckstein, Dresden (DE); Hans-Joachim Danzer, Eschen (LI)

(73) Assignee: Wood Innovations Ltd., Eschen (LI)

( * ) Notice: Subject to any disclaimer, the term of this patent is extended or adjusted under 35 U.S.C. 154(b) by 0 days.

(21) Appl. No.: 16/098,707

(22) PCT Filed: May 8, 2017

(86) PCT No.: PCT/EP2017/060929
§ 371 (c)(1),
(2) Date: Nov. 2, 2018

(87) PCT Pub. No.: WO2017/191326
PCT Pub. Date: Nov. 9, 2017

(65) Prior Publication Data
US 2019/0143650 A1 May 16, 2019

(30) Foreign Application Priority Data
May 6, 2016 (EP) .................................... 16001036

(51) Int. Cl.
| B32B 21/04 | (2006.01) |
| B32B 3/28 | (2006.01) |
| B32B 21/14 | (2006.01) |
| B32B 21/06 | (2006.01) |
| B32B 21/10 | (2006.01) |
| B32B 21/13 | (2006.01) |
| B32B 7/12 | (2006.01) |
| E04C 2/12 | (2006.01) |
| E04C 2/32 | (2006.01) |
| B32B 15/10 | (2006.01) |
| B32B 1/00 | (2006.01) |
| B32B 13/10 | (2006.01) |
| B32B 21/00 | (2006.01) |
| B32B 21/08 | (2006.01) |
| E04C 2/16 | (2006.01) |
| B32B 9/00 | (2006.01) |
| E04C 2/34 | (2006.01) |

(52) U.S. Cl.
CPC .............. *B32B 21/042* (2013.01); *B32B 1/00* (2013.01); *B32B 3/28* (2013.01); *B32B 7/12* (2013.01); *B32B 9/005* (2013.01); *B32B 13/10* (2013.01); *B32B 15/10* (2013.01); *B32B 21/00* (2013.01); *B32B 21/04* (2013.01); *B32B 21/06* (2013.01); *B32B 21/08* (2013.01); *B32B 21/10* (2013.01); *B32B 21/13* (2013.01); *B32B 21/14* (2013.01); *E04C 2/12* (2013.01); *E04C 2/16* (2013.01); *E04C 2/322* (2013.01); *E04C 2/326* (2013.01); *B32B 2250/03* (2013.01); *B32B 2250/04* (2013.01); *B32B 2250/05* (2013.01); *B32B 2250/40* (2013.01); *B32B 2250/42* (2013.01); *B32B 2479/00* (2013.01); *B32B 2605/00* (2013.01); *B32B 2605/003* (2013.01); *B32B 2605/12* (2013.01); *E04C 2002/3466* (2013.01); *E04C 2002/3472* (2013.01); *Y10T 428/249924* (2015.04)

(58) Field of Classification Search
CPC ......... B32B 21/042; B32B 7/12; B32B 21/06; B32B 21/10; B32B 21/13; B32B 21/14; B32B 3/28; B32B 2479/00; B32B 2605/003; B32B 2250/03; B32B 2250/04; B32B 2250/05; B32B 2250/40; B32B 2250/42; B32B 2605/00; B32B 2605/12; B32B 9/005; B32B 13/10; B32B 15/10; B32B 21/00; B32B 21/04; B32B 21/08; B32B 1/00; E04C 2/326; E04C 2/12; E04C 2002/3466; E04C 2002/3472; E04C 2/16; E04C 2/322; Y10T 428/249924
See application file for complete search history.

(56) References Cited

U.S. PATENT DOCUMENTS

2013/0001827 A1  1/2013  Trost et al.
2013/0316125 A1* 11/2013  Moeller ................. E04C 2/322
                                                          428/106

FOREIGN PATENT DOCUMENTS

| BE | 547811 A | 5/1956 |
| CH | 254025 A | 4/1948 |
| DE | 4201201 A1 | 7/1993 |
| DE | 10124912 C1 | 12/2002 |
| DE | 102008022805 A1 | 11/2009 |
| DE | 102008022806 A1 | 11/2009 |
| EP | 1923209 A1 | 5/2008 |
| EP | 2660408 A1 | 11/2013 |
| EP | 2873522 A1 | 5/2015 |
| WO | 9963180 A1 | 12/1999 |
| WO | 2015067362 A1 | 5/2015 |
| WO | 2015149942 A1 | 10/2015 |

OTHER PUBLICATIONS

International Searching Authority, Search Report issued in International Application No. PCT/EP2017/060929 dated Jun. 8, 2017 (and English Translation), 4 pages.

\* cited by examiner

*Primary Examiner* — David Sample
*Assistant Examiner* — Donald M Flores, Jr.
(74) *Attorney, Agent, or Firm* — Wood Herron & Evans LLP

(57) ABSTRACT

A core layer is provided which is suitable for a multilayer composite that includes at least one cover layer and the core layer. The cover layer is arranged so as to at least partially cover the core layer and be fixedly connected thereto. The multilayer composite includes the core layer, the core layer having layers which have corrugated wooden elements. The corrugated wooden elements are arranged in an oriented manner in at least one layer.

14 Claims, No Drawings

MULTILAYER COMPOSITE HAVING CORRUGATED WOODEN ELEMENTS

CROSS-REFERENCE TO RELATED APPLICATION

This application is a national phase entry of, and claims priority to, International Application No. PCT/EP2017/060929, filed May 8, 2017 which claims priority to EP Application Number 16001036.9, filed May 6, 2016. The above-mentioned patent applications are incorporated herein by reference in their entireties.

TECHNICAL FIELD

The present invention relates to a core layer which comprises corrugated wooden elements and is suitable for producing a multilayer composite, preferably for producing a lightweight building board, and a multilayer composite which comprises the core layer. The invention also relates to a method for producing the core layer and the multilayer composite, and the use thereof.

BACKGROUND

It is known to use wood-based multilayer composites for example in the form of lightweight building boards. Several examples of such composites are described in the following references.

Swiss Patent No. CH 254025 discloses a multilayer composite which comprises two cover boards and a core layer therebetween, the core layer comprising at least one layer of folded veneer.

German Patent No. DE 42 01 201 discloses a wooden semi-finished product or finished product which is made of laminar surface elements. The laminar elements can be zigzag-shaped. They can be randomly distributed together with surface elements or overlap in the manner of scales.

German Patent Application No. DE 10 2008 022 806 discloses a lightweight building board comprising a corrugated wood veneer layer. The waves can be zigzag-shaped.

Belgium Patent Application No. BE 547 811 discloses a core layer consisting of two zigzag-shaped wooden elements which are arranged between two cover layers.

German Patent Application No. DE 10 2008 022805 A1 discloses a corrugated veneer board and lightweight building boards constructed therefrom. The wave structure of the wooden elements used can be zigzag-shaped, sinusoidal and trapezoidal. The wooden elements can be stacked inside one another.

European Patent No. EP 1 923 209 discloses a lightweight building composite board comprising outer layers and a central layer, the central layer being arranged at an angle with respect to the plane of the lightweight building composite board.

A common feature of these multilayer composites from the prior art is that the core layer can have a loosened structure. When force is applied perpendicularly with respect to the surface of the multilayer composite, said multilayer composite has a damping effect since the core layer can be at least partially compressed.

These multilayer composites often require the use of high-quality starting products, since imperfections in the starting material cannot be tolerated or can only be tolerated to a small extent. In addition to the high quality of the raw materials, very high-quality corrugated webs are also required, since, inter alia, the cohesion between the individual layers can only be guaranteed at a relatively low pressure during production of the core layer. However, the low pressure during compression leads to the core layer obtained having a low dimensional stability. Although the formation of cavities has a favorable effect on the ratio of weight to stability, it can also lead to the core layer having impaired machinability in terms of drill machining and also the introduction and retaining capacity of standardized fittings, if for example nails or screws encounter cavities.

Improved retaining capacity of fittings of a core layer is disclosed in European Patent No. EP 2 660 408. This document discloses a core layer which is suitable for a multilayer composite that has at least one cover layer and a core layer, the cover layer being arranged so as to at least partially cover the core layer and be fixedly connected thereto, the core layer comprising zigzag-shaped elements made of wood which have laminar regions that are arranged in the shape of a zigzag, a zig region of an element together with an adjacent zag region of the zigzag-shaped element forming a common edge therebetween, and zigzag-shaped elements being arranged in the core layer such that two edges of this kind of two zigzag-shaped elements which can be the same or different from one another intersect at an angle that is different to zero, the two elements being fixedly interconnected at the intersection point.

International PCT Patent Publication No. WO 2015/067362 discloses a core layer which comprises zigzag-shaped wooden elements, preferably wooden elements having a wave structure, and is suitable for producing a multilayer composite or for production in a multilayer composite, preferably for producing a lightweight building board, and a multilayer composite which comprises the core layer.

A core layer comprising corrugated wooden elements is also disclosed in International PCT Patent Publication No. WO 2015/149942.

By randomly scattering wave-like particles, the three documents mentioned last provide core layers which, by comparison with the above-mentioned prior art, facilitate the production of a light, stable core layer or lightweight building board from significantly lower quality raw materials. Good processing of the lightweight building board, even in relation to the introduction of standardized fittings, is achieved by these core layers.

International Patent Publication No. WO 99/63180 discloses a laminar wooden component made of at least two layers glued together. At least one of the layers consists of a corrugated wooden layer that supports a further layer glued onto the rear of the wave at least on one side.

European Patent No. EP 2 873 522 discloses a composite board comprising a central layer having a cover layer made of a wooden material arranged in each case above and below said central layer, the central layer comprising corrugated slats.

The problem addressed by the present invention is that of providing a core layer and a multilayer composite in the form of a lightweight building board containing the core layer, which multilayer composite has improved stability with respect to conventional multilayer composites having the same density or which, if the multilayer composite has a decreased density, has comparable stability with respect to conventional lightweight building boards. It would be desirable to provide such a core layer and a multilayer composite to improve this art field.

SUMMARY

This problem is solved according to the invention by a core layer which is suitable for a multilayer composite that comprises at least one cover layer and the core layer, the cover layer being arranged so as to at least partially cover the core layer and be fixedly connected thereto, and the multilayer composite comprising the core layer, the core layer comprising layers which have corrugated wooden elements, the corrugated wooden elements being arranged in an oriented manner in at least one layer.

In one embodiment, the invention relates in particular to a core layer as defined in the following points:

(1) Core layer which comprises at least: one layer comprising corrugated wooden elements arranged above one another, wherein the wooden elements extend in one direction; wherein the corrugated wooden elements are arranged in the layer so as to be oriented such that wave troughs of overlying wooden elements interlock, or such that wave crests of overlying wooden elements interlock, or such that wave troughs of overlying wooden elements interlock and wave crests of overlying wooden elements interlock, and wherein at least some of the wooden elements are arranged in the layer such that these wooden elements form cavities therebetween.

(2) Core layer which comprises at least: a first layer comprising first corrugated wooden elements arranged above one another, wherein the first wooden elements extend in a first direction; and a second layer comprising second corrugated wooden elements arranged above one another, wherein the second wooden elements extend in a second direction; wherein the first and the second layer are arranged above one another and contact one another; wherein first corrugated wooden elements are arranged in the first layer so as to be oriented such that wave troughs of overlying first wooden elements interlock, or such that wave crests of overlying first wooden elements interlock, or such that wave troughs of overlying first wooden elements interlock and wave crests of overlying first wooden elements interlock, and wherein at least some of the first wooden elements are arranged in the first layer such that these wooden elements form cavities therebetween; wherein second corrugated wooden elements are arranged in the second layer so as to be oriented such that wave troughs of overlying second wooden elements interlock, or such that wave crests of overlying second wooden elements interlock, or such that wave troughs of overlying second wooden elements interlock and wave crests of overlying second wooden elements interlock; and wherein at least some of the second wooden elements are arranged in the second layer such that these wooden elements form cavities therebetween; wherein the first and the second direction are different from one another.

(3) Core layer which comprises at least: a first layer comprising first corrugated wooden elements arranged above one another, wherein the first wooden elements extend in a first direction; and a second layer comprising second corrugated wooden elements arranged above one another; wherein the first and the second layer are arranged above one another and contact one another; wherein first corrugated wooden elements are arranged in the first layer so as to be oriented such that wave troughs of overlying first wooden elements interlock, or such that wave crests of overlying first wooden elements interlock, or such that wave troughs of overlying first wooden elements interlock and wave crests of overlying first wooden elements interlock, and wherein at least some of the first wooden elements are arranged in the first layer such that these wooden elements form cavities therebetween; wherein second corrugated wooden elements are randomly arranged in the second layer.

(4) Core layer according to either point 2 or point 3, comprising a third layer comprising third corrugated wooden elements on top of one another.

(5) Core layer according to point 3 and point 4, wherein the first layer and the third layer surround the second layer in a sandwich-like manner, wherein third corrugated wooden elements extend in the third layer in a third direction, and wherein the third wooden elements are arranged so as to be oriented such that wave troughs of overlying third wooden elements interlock, or such that wave crests of overlying third wooden elements interlock, or such that wave troughs of overlying third wooden elements interlock and wave crests of overlying third wooden elements interlock, and wherein at least some of the third wooden elements are arranged in the third layer such that these wooden elements form cavities therebetween; wherein the first direction is the same as or is different from the third direction.

(6) Core layer according to point 3 and point 4, wherein the second layer and the third layer surround the first layer in a sandwich-like manner, wherein third corrugated wooden elements are randomly arranged in the third layer.

(7) Core layer according to point 2 and point 4, wherein the first and the third layer surround the second layer in a sandwich-like manner, wherein third corrugated wooden elements are randomly arranged in the third layer.

(8) Core layer according to point 2 and point 4, wherein the first and the third layer surround the second layer in a sandwich-like manner, wherein third corrugated wooden elements extend in the third layer in a third direction, wherein the third wooden elements are arranged so as to be oriented such that wave troughs of overlying third wooden elements interlock, or such that wave crests of overlying third wooden elements interlock, or such that wave troughs of overlying third wooden elements interlock and wave crests of overlying third wooden elements interlock, and wherein at least some of the third wooden elements are arranged in the third layer such that these wooden elements form cavities therebetween; wherein the second direction and the third direction are different from one another.

(9) core layer which comprises at least: a first layer comprising only one first corrugated wooden element which extends in a first direction; and a second layer comprising only one second corrugated wooden element which extends in a second direction; wherein the first and the second layer are arranged above one another and contact one another; wherein the first and the second direction are different from one another; and wherein the corrugated wooden elements comprise or consist of oriented strand board (hereinafter referred to as "OSB") strands or a strand-like material.

(10) Core layer according to any of the preceding points, wherein first, second and/or third corrugated wooden elements comprise fibers having a preferred direction.

(11) Core layer according to point 10, wherein the preferred direction of the fibers is the same as the direction of extension of the first, second and/or third wooden element.

(12) Core layer according to either point 10 or point 11, wherein the edges of the first, second and/or third wooden element do not extend in parallel with the preferred direction; or wherein the edges of the first, second and/or third wooden element extend perpendicularly with respect to the preferred direction.

(13) Core layer according to any of the preceding points, wherein corrugated wooden elements comprise or consist of a veneer or OSB strands or a strand-like material.

(14) Multilayer composite, at least comprising a cover layer and a core layer, wherein the cover layer is arranged so as to at least partially cover the core layer and be fixedly connected thereto, wherein the core layer is a core layer as defined in any of points 1 to 13, preferably wherein the cover layer comprises a material selected from: veneer, wood board, chipboard, fiberboard, plywood board, plastics board, plasterboard, sheet metal, fiber cement board, paper or cardboard, and from two or more thereof.

(15) Method for producing a multilayer composite comprising a core layer and at least one cover layer, the method comprising the steps (A), (B), the step (D), and optionally the step (C): (A) scattering OSB strands or a strand-like material so as to form a first layer by a scattering device which is designed such that the OSB strands or the strand-like material are randomly arranged in the first layer; (B) applying a second layer to the first layer by scattering corrugated wooden elements by a scattering device which is designed such that the wooden elements can be scattered so as to extend in one direction, wherein the corrugated wooden elements are arranged so as to be oriented such that wave troughs of overlying wooden elements interlock, or such that wave crests of overlying wooden elements interlock, or such that wave troughs of overlying wooden elements interlock and wave crests of overlying wooden elements interlock, and wherein at least some of the wooden elements are arranged in the second layer such that these wooden elements form cavities therebetween; and optionally; (C) applying a third layer to the second layer by scattering OSB strands or a strand-like material by a scattering device which is designed such that the OSB strands or the strand-like material are randomly arranged in the third layer; and (D) compressing the layers formed in steps (A), (B) and the optional step (C), wherein OSB strands or strand-like material and corrugated wooden elements contacting one another can be fixedly interconnected in each case by an adhesive.

(16) Deformed core layer which can be produced according to a method that comprises at least the step (X): (X) pressure-deforming the core layer according to any of points 1 to 13; or deformed multilayer composite at least comprising a cover layer and a core layer, wherein the cover layer is arranged so as to at least partially cover the core layer and be fixedly connected thereto, which deformed multilayer composite can be produced according to a method that comprises at least the step (Y): (Y) pressure-deforming the multilayer composite according to point 14 or the multilayer composite produced according to point 15.

(17) Use of a core layer according to any of points 1 to 13; or of a multilayer composite according to point 14 or produced according to point 15; or of a deformed core layer or of a deformed multilayer composite according to point 16; in the production of furniture, for shelving, for packaging for transport, for interior structures, in doors and gates, and in the construction of vehicles and ships.

The core layer according to the invention advantageously has a very high strength during layered assembly whilst using very little material, due to the crisscrossed adhesion of the individual layers of the core layer. In this case, when the density is reduced by comparison with the random scattering, at least the same stability can be achieved or, when the density is the same, increased strength can be achieved. Good processing of the lightweight building board according to the invention, even in relation to the introduction of standardized fittings, is likewise achieved.

The cavities present produce an advantageously loosened structure, the structure at the same time maintaining a high strength by the interlocking of wave crests and wave troughs. This means that high stability is ensured despite the decreased density. This arrangement is particularly advantageous.

DETAILED DESCRIPTION

The terms used in the following description and provided in quotation marks are defined within the meaning of the invention.

Core Layer According to the Invention Comprising Layers of First, Second and/or Third Corrugated Wooden Elements In one embodiment, the invention relates to a core layer, the core layer comprising layers, i.e. individual layers, that have corrugated wooden elements, the corrugated wooden elements being arranged in an oriented manner in at least one layer.

Wooden elements of the first (individual) layer are in this case referred to as first wooden elements, wooden elements of the second (individual) layer are referred to as second wooden elements, etc. The number of wooden elements in the individual layers can be the same or different.

The term "core layer" signifies a core layer which is suitable for producing a multilayer composite, or which can be present in a multilayer composite. According to the invention, the core layer comprises elements made of wood which are corrugated.

The term "wooden element" signifies a component part or a component of the core layer according to the invention or of the multilayer composite according to the invention in the form of a lightweight building board. In the following, this element is also referred to as a lightweight building board element.

In their broadest meaning, the terms "wave" or "wave structure" or "corrugated" or "wave-like" describe at least one wave crest and one wave trough in the wave. In the mathematical sense, the wave therefore has at least one positive and negative half-wave.

The term "wave" in the wooden element is illustrated in the physical sense by a spatially expanding oscillation. The direction of the spatially propagating wave in this case defines the direction in which the wooden element extends.

The terms used also include repeating corrugated structural units in the element.

The wave can be characterized in the mathematical sense by the elongation of the oscillation, by the amplitude of the oscillation and also by the oscillation plane of the positive or negative half-wave, i.e. of the wave crest and wave trough. It is also possible to characterize the wave by the wave length, i.e. by the length of a wave crest and of the subsequent wave trough. The transition between a wave crest and a wave trough can, depending on the shape of the wave, be characterized by an inflection point in the wave-shaped curve and also by a straight portion.

The wave can be varied in terms of the amplitude or wave length or amplitude and wave length thereof. As a result, the thickness of the core layer in the lightweight building board can also be influenced, as can the rigidity thereof. It is also possible for the rigidity of the lightweight building board to be influenced by board parameters such as the wave height or the thickness of the corrugated or wave-like element in the lightweight building board, the chip and fiber geometry in the element, the compaction of the elements in the board and also the degree to which the elements adhesively bond to one another and to the cover layers of the board.

The form of the wave can in this case assume any conceivable structure.

In one embodiment, the wave is in the form of a sine function or a function which is similar to a sine function, i.e.

it is in the form of a sine function and/or is sinusoidal. In the following, the terms "sine-shaped" or "sinusoidal" are used as synonyms.

In a further embodiment, the wave is in the form of a triangle wave. The term "triangle wave" also comprises the term "triangle-like wave".

In a further embodiment, the wave is in the form of a sawtooth wave. An oscillation of this kind can also be referred to as a tilt wave.

In a further embodiment, the wave is in the form of a rectangular wave.

The mentioned wave shapes are known in physics and can also be described mathematically.

In a further embodiment, the wave has different wave shapes, i.e. at least two, or three or four, wave shapes selected from: triangle wave, sinusoidal wave, sawtooth wave or rectangular wave.

In one embodiment, these waves can be arranged in the corrugated element in any sequence along a common propagation direction.

In a further embodiment, two or more of the aforementioned wave types can also be superimposed in a common propagation direction and form a correspondingly new wave shape.

For example, a trapezoidal wave can result from suitable superimposition.

The wave shape in the corrugated element can also be described in that the corrugated wooden element in the form of a lightweight building board element has laminar regions, a laminar region in the corrugated element together with an adjacent laminar region in the corrugated element forming a common edge therebetween such that the element is corrugated. The laminar regions, including the edge, therefore form a wave.

The term "laminar regions" includes regions which are in the form of surfaces. The surfaces can be planar, i.e. flat, or also non-planar, i.e. not flat, preferably then curved, preferably convex or concave, or corrugated.

The term "edge" includes terms such as "transition region between two adjacent laminar regions." This transition region can be an edge which is sharply defined. The term also includes an edge which is a curved surface or a flat (planar) surface. The term "edge" therefore includes a sharp edge in the form of a line and a wavy or corrugated edge in the form of a curve-shaped plane or a curved region between two laminar regions. The laminar regions in the corrugated element therefore form a corrugated structure, i.e. a wave crest follows a wave trough and vice versa.

The term "curved surface" means a convex surface or a concave surface or a surface that has both a convex and a concave portion. In particular, the term "curved" also means "continuously curved."

An edge therefore extends over a wave crest or in a wave trough. An edge is therefore formed by a wave crest or a wave trough.

Edges which are formed by adjacent laminar regions in the corrugated element are preferably oriented in parallel with one another.

A corrugated element is therefore disclosed which has laminar regions, a laminar region in the corrugated element together with an adjacent laminar region in the corrugated element forming a common edge therebetween such that the element is corrugated, (a) the laminar regions being flat surfaces and the edge between the flat surfaces being a line. A wave of this kind can be described as a zigzag wave; or (b) the laminar regions being flat surfaces and the edge between the flat surfaces being a curved surface; or (c) the laminar regions being flat surfaces and the edge between the flat surfaces being a flat surface; or (d) the laminar regions being curved surfaces and the edge between the curved surfaces being a curved surface, preferably a convex surface; or (e) the laminar regions being curved surfaces and the edge between the curved surfaces being straight; or (f) the laminar regions being curved surfaces and the edge between the curved surfaces being a flat surface.

In one embodiment, the wave has at least one or two or three or four or five or six of the wave shapes (a) to (f).

In one embodiment, the element is formed of (c') an element (c) such that the wave, when viewed in longitudinal section, has repeating units in the form of a trapezoid; or (d') elements (d) such that the wave, when viewed in longitudinal section, has repeating units in the form of a sine function or a sinusoidal function.

The good compressive and shear strength and rigidity of the elements (a) to (f) or of a core layer containing these elements or of a multilayer composite containing the core layer can still be greatly improved if the core layer in particular contains or consists of elements (d').

Wave shapes of this kind are known and are disclosed in European Patent Application No. EP 2 660 408 A1, International PCT Patent Publication No. WO 2015/067362 and International PCT Patent Publication No. WO 2015/149942. Reference is expressly made to these documents for further clarification. Other corrugated wooden elements which are known from the other prior art mentioned at the outset can be used, optionally after comminution, as starting products for the core layer according to the invention.

The invention relates in particular to a core layer which comprises at least: a first layer comprising first corrugated wooden elements arranged above one another, wherein the first wooden elements extend in a first direction; and a second layer comprising second corrugated wooden elements arranged above one another, wherein the second wooden elements extend in a second direction; wherein the first and the second layer are arranged above one another and contact one another; wherein first corrugated wooden elements are arranged in the first layer so as to be oriented such that wave troughs of overlying first wooden elements interlock, or such that wave crests of overlying first wooden elements interlock, or such that wave troughs of overlying first wooden elements interlock and wave crests of overlying first wooden elements interlock; wherein second corrugated wooden elements are arranged in the second layer so as to be oriented such that wave troughs of overlying second wooden elements interlock, or such that wave crests of overlying second wooden elements interlock, or such that wave troughs of overlying second wooden elements interlock and wave crests of overlying second wooden elements interlock; wherein the first and the second direction are different from one another.

The term "oriented" therefore means that wave troughs of overlying wooden elements interlock, or that wave crests of overlying wooden elements interlock, or that wave troughs of overlying wooden elements interlock and wave crests of overlying wooden elements interlock.

In a preferred embodiment, the term "oriented" includes overlying wooden elements forming cavities therebetween at least in part. For example, three overlying wooden elements can be arranged so as to overlap only in part such that wave crests or wave troughs each interlock in the overlapping region of the three wooden elements, a cavity then being formed between the upper and the lower wooden element which surrounds the further wooden element in a sandwich-like manner. Cavities are therefore formed between first wooden elements in the first layer.

The invention consequently also relates to a core layer which comprises: a first layer comprising first corrugated wooden elements arranged above one another, wherein the first wooden elements extend in a first direction; and a second layer comprising second corrugated wooden elements arranged above one another, wherein the second wooden elements extend in a second direction; wherein the first and the second layer are arranged above one another and contact one another; wherein first corrugated wooden elements are arranged in the first layer so as to be oriented such that wave troughs of overlying first wooden elements interlock, or such that wave crests of overlying first wooden elements interlock, or such that wave troughs of overlying first wooden elements interlock and wave crests of overlying first wooden elements interlock, and wherein first wooden elements are arranged in the first layer such that these wooden elements form cavities therebetween; wherein second corrugated wooden elements are arranged in the second layer so as to be oriented such that wave troughs of overlying second wooden elements interlock, or such that wave crests of overlying second wooden elements interlock, or such that wave troughs of overlying second wooden elements interlock and wave crests of overlying second wooden elements interlock, and wherein second wooden elements are arranged in the second layer such that these wooden elements form cavities therebetween; wherein the first and the second direction are different from one another.

In one embodiment, the term "wherein the first and the second direction are different from one another" means that first wooden elements of the first layer which contact second wooden elements of the second layer are arranged such that wave troughs of the contacting wooden elements do not interlock, or such that wave crests of the contacting wooden elements do not interlock, or such that wave troughs of the contacting wooden elements do not interlock and wave crests of the contacting wooden elements do not interlock.

However, it is also quite possible, as a result of the scattering method, for a wooden element that actually belongs for example to the second layer to be rotated by comparison with further second wooden elements and even have the orientation of first wooden elements. In any given case, the orientation of the wooden elements in a layer can deviate from one another by up to 90°. A second wooden element of this kind can therefore be arranged in the same direction as a first wooden element. For second wooden elements of this kind, the second direction is then the same as the first direction.

In one embodiment, the angle between the first direction and the second direction is in the range of from 45 to 135°. The angle is preferably 90°.

The first wooden elements can be the same as or different from the second wooden elements.

Alternatively, the invention relates to a core layer which comprises at least: a first layer comprising first corrugated wooden elements arranged above one another, wherein the first wooden elements extend in a first direction; and a second layer comprising second corrugated wooden elements arranged above one another, wherein the second wooden elements extend in a second direction; wherein the first and the second layer are arranged above one another and contact one another; wherein first corrugated wooden elements are arranged in the first layer so as to be oriented such that wave troughs of overlying first wooden elements interlock, or such that wave crests of overlying first wooden elements interlock, or such that wave troughs of overlying first wooden elements interlock and wave crests of overlying first wooden elements interlock; wherein second corrugated wooden elements are randomly arranged in the second layer.

In turn, in one embodiment first wooden elements can be arranged in the first layer such that these wooden elements form cavities therebetween.

The term "randomly" is understood to mean that the second wooden elements are arranged in the second layer in a disordered manner. The layer comprises cavities.

In a further embodiment, the core layer comprises a third layer comprising third corrugated wooden elements on top of one another. These third wooden elements can optionally extend in a third direction.

These third wooden elements can be the same as or different from the first and second wooden elements.

In a further embodiment, the first layer and the third layer surround the second layer, in which the second wooden elements are randomly arranged, in a sandwich-like manner, wherein third corrugated wooden elements extend in the third layer in a third direction, wherein the third wooden elements are arranged so as to be oriented such that wave troughs of overlying third wooden elements interlock, or such that wave crests of overlying third wooden elements interlock, or such that wave troughs of overlying third wooden elements interlock and wave crests of overlying third wooden elements interlock, wherein the first direction is the same as or is different from the third direction.

In a preferred embodiment, the third wooden elements are arranged in the third layer such that these wooden elements form cavities therebetween at least in part.

In a further embodiment, the second layer, in which the second wooden elements are randomly arranged, and the third layer surround the first layer in a sandwich-like manner, wherein third corrugated wooden elements are randomly arranged in the third layer.

In one embodiment, the first and the third layer surround the second layer, in which the second wooden elements extend in a second direction, in a sandwich-like manner, wherein third corrugated wooden elements are randomly arranged in the third layer.

In a further embodiment, the first and the third layer surround the second layer, in which the second wooden elements extend in a second direction, in a sandwich-like manner, wherein third corrugated wooden elements extend in a third direction, wherein the third wooden elements are arranged in the third layer so as to be oriented such that wave troughs of overlying third wooden elements interlock, or such that wave crests of overlying third wooden elements interlock, or such that wave troughs of overlying third wooden elements interlock and wave crests of overlying third wooden elements interlock; wherein the second direction and the third direction are different from one another.

In one embodiment, the angle between the second direction and the third direction is in the range of from 45 to 135°. It is preferably 90°.

In a further embodiment, the invention relates to a core layer which comprises at least: one layer comprising corrugated wooden elements arranged above one another, wherein the wooden elements extend in one direction; wherein the corrugated wooden elements are arranged in the layer so as to be oriented such that wave troughs of overlying wooden elements interlock, or such that wave crests of overlying wooden elements interlock, or such that wave troughs of overlying wooden elements interlock and wave crests of overlying wooden elements interlock; and wherein at least some of the wooden elements are arranged in the layer such that these wooden elements form cavities therebetween.

In one embodiment, edges that are formed by the wave troughs or the wave crests of first, second and/or third corrugated wooden elements extend in parallel with one another.

In a further embodiment, first, second and/or third corrugated wooden elements comprise fibers having a preferred direction.

In this case, the preferred direction of the fibers is preferably the same as the direction of extension of the first, second and/or third wooden element. In this case, the direction of extension is the same as the propagation direction of the wave in the corrugated wooden element.

The edges preferably do not extend in parallel with the preferred direction of the fibers.

The edges preferably extend perpendicularly with respect to the preferred direction of the fibers. The term "perpendicularly with respect to the direction of the fibers" means that a deviation at an angle of up to approximately 30° is also possible.

Consequently, in a preferred embodiment, first, second and/or third corrugated wooden elements comprise fibers having a preferred direction.

The first, second and/or third corrugated wooden elements are further defined by a slenderness ratio. The term "slenderness ratio" defines the ratio of the length to the width of the wooden elements.

In one embodiment, first, second and/or third corrugated wooden elements have a slenderness ratio in the range of from 20:1 to 3:1, preferably 20:1 to 4:1.

In one embodiment, the length is in the range of from 30 to 200 mm, preferably 50 to 200 mm, and the width is in the range of from 10 mm to 50 mm.

The thickness of a first, second and/or third corrugated wooden element is preferably in the range of from 0.2 mm to 2 mm.

The term "thickness" signifies the material thickness of the planar starting material, i.e. the smallest distance between two surfaces of a corrugated wooden element. These surfaces are spaced apart from one another by the thickness.

In a further embodiment, the height of a first, second and/or third wooden element is in the range of from 0.8 mm to 8 mm.

The term "height" is defined as the shortest distance between two imaginary planes between which the first, second and/or third corrugated wooden element can be arranged such that the edges which are formed by the wave troughs and wave crests of the first, second and/or third corrugated wooden element are within one of these planes.

In one embodiment, first, second and/or third corrugated wooden elements comprise or consist of a veneer or oriented strand board (hereinafter referred to as "OSB") chips.

In a preferred embodiment, the corrugated wooden elements are not zigzag-shaped. In particular, this means that the edge is not a sharp line.

The core layer is preferably planar.

Method for Producing a Core Layer Comprising Wooden Elements Arranged in a Wave Shape The invention also relates to a method for producing a core layer according to the invention as defined above.

In this case, in a first step, first corrugated wooden elements are scattered by a scattering device so as to extend in a first direction, which also means that the first corrugated wooden elements are arranged so as to be oriented such that wave troughs of overlying first wooden elements interlock, or such that wave crests of overlying first wooden elements interlock, or such that wave troughs of overlying first wooden elements interlock and wave crests of overlying first wooden elements interlock.

According to the invention, this method therefore comprises at least the step (A): (A) scattering first corrugated wooden elements so as to form the first layer by a scattering device which is designed such that first corrugated wooden elements extend in the first layer in a first direction, the first corrugated wooden elements being arranged so as to be oriented such that wave troughs of overlying first wooden elements interlock, or such that wave crests of overlying first wooden elements interlock, or such that wave troughs of overlying first wooden elements interlock and wave crests of overlying first wooden elements interlock.

The following steps can subsequently preferably be added thereto: (B) applying a second layer to the first layer by scattering second wooden elements, it being possible to randomly scatter the second wooden elements, or it being possible to scatter the second wooden elements so as to extend in a second direction, the second corrugated wooden elements being arranged so as to be oriented such that wave troughs of overlying second wooden elements interlock, or such that wave crests of overlying second wooden elements interlock, or such that wave troughs of overlying second wooden elements interlock and wave crests of overlying second wooden elements interlock; (C) applying a third layer to the second layer by scattering third wooden elements, it being possible to randomly scatter the third wooden elements, or it being possible to scatter the third wooden elements so as to extend in a third direction, the third corrugated wooden elements being arranged so as to be oriented such that wave troughs of overlying third wooden elements interlock, or such that wave crests of overlying third wooden elements interlock, or such that wave troughs of overlying third wooden elements interlock and wave crests of overlying third wooden elements interlock.

Even if the wooden elements are arranged in an oriented manner, scattering the wooden elements produces layers in which the wooden elements are arranged so as to form cavities therebetween at least in part. This is self-evidently also the case if the wooden elements are randomly scattered.

Furthermore, it is also possible to first apply the third layer, then to apply the first layer to the third layer, and to apply the second layer thereto.

First, second and/or third wooden elements that contact one another are usually fixedly interconnected. A suitable connecting means is preferably an adhesive. Suitable adhesives are known in the prior art.

The fixed connection is facilitated by applying pressure, the compaction also producing the required homogeneity, the pressure preferably being in a range of from 0.02 MPa to 2.5 MPa, more preferably in a range of from 0.01 to 1.0 MPa.

Generally, more than 50% of the first, second and/or third wooden elements are present in the core layer in such a way that they are fixedly interconnected, preferably more than 60%, or more than 70%, or more than 80%, or more than 90%, or even 100%, of the wooden elements being arranged in the core layer so as to be fixedly interconnected. 100% of the wooden elements are preferably arranged so as to be fixedly interconnected. In this embodiment, the core layer according to the invention has a higher mechanical stability by comparison with a core layer in which not all of the wooden elements are fixedly interconnected.

Each of the steps (A) to (C) can be carried out in the presence of a cover layer. The method is preferably then carried out such that the wooden elements provided with an adhesive are placed on the cover layer according to step (A), the steps (B) and (C) then coming after.

This arrangement is preferably then covered by a further cover layer and compressed. This produces a multilayer composite comprising two cover layers and a core layer therebetween.

Edges or wooden elements of the core layer according to the invention can be produced by folding a laminar wooden element made of veneer or OSB strands (OSB chips) or a strand-like material (chip-like material), preferably wood. Suitable devices for folding are known from the prior art. A laminar wooden element can preferably be directed through a high-speed profile roller pair, as described in DE 42 01 201. The folding preferably occurs substantially transversely with respect to the direction of the wood fibers. In one embodiment, the wood structure previously plasticized by the effects of moisture and heat is in this case buckled, i.e. shaped so as to be articulated at the relevant folding edge preferably by locally compressing the wood fibers. The folding can be carried out such that it is at least largely possible to avoid folding back the regions arranged in the shape of a zigzag in the corrugated wooden element in the starting layer.

In a further embodiment, a corrugated wooden element can be produced by guiding a laminar wooden element through a suitably profiled roller pair.

In a further embodiment, the edge is produced by cutting. In one embodiment, for this purpose, a veneer or an OSB chip is cut by a suitable knife or a suitable cutting edge which is profiled in a corrugated manner. Devices and methods are known from the prior art.

In a further embodiment, the edge and the wooden element are produced by shaping, as described in US 2013/0001827.

In one embodiment, the folding or cutting or shaping is carried out such that the length of the fibers in the resulting wooden element is at least twice as long as the thickness of the corrugated wooden element.

The corrugated or wave-shaped elements obtained by cutting or folding can be further comminuted if this is desired. Suitable cutting devices are known from the prior art.

Core Layer According to the Invention Comprising Layers Which Each Have Only One Corrugated Wooden Element In a further embodiment, it is also possible for both the first and the second layer to each comprise only one corrugated wooden element, that is to say the first layer comprises a first corrugated wooden element, and the second layer comprises a second corrugated wooden element.

In this embodiment, the invention therefore relates to a core layer which comprises at least: a first layer comprising a first corrugated wooden element which extends in a first direction; and a second layer comprising a second corrugated wooden element which extends in a second direction; wherein the first and the second layer are arranged above one another and contact one another; wherein the first and the second direction are different from one another.

In one embodiment, the angle between the second direction and the third direction is in the range of from 45 to 135°. It is preferably 90°.

In one embodiment, the core layer also comprises a third layer comprising a third corrugated wooden element, the third layer contacting the second layer.

In one embodiment, edges that are formed by the wave troughs or the wave crests of first, second and/or third corrugated wooden elements extend in parallel with one another.

In a further embodiment, first, second and third corrugated wooden elements comprise fibers having a preferred direction.

In this case, the preferred direction of the fibers is preferably the same as the direction of extension of the first, second and/or third wooden element. In this case, the direction of extension is the same as the propagation direction of the wave.

The edges formed by the wave crests and wave troughs preferably do not extend in parallel with the preferred direction of the fibers.

The edges preferably extend perpendicularly with respect to the preferred direction of the fibers. The term "perpendicularly with respect to the direction of the fibers" means that a deviation at an angle of up to approximately 30° is also possible.

The first, second and/or third corrugated wooden elements are further defined by a slenderness ratio. The term "slenderness ratio" defines the ratio of the length to the width of the wooden elements.

In one embodiment, first, second and/or third corrugated wooden elements have a slenderness ratio in the range of from 20:1 to 2:1.

In one embodiment, the length is in the range of from 200 to 4,000 mm, preferably 500 to 2,000 mm, and the width is in the range of from 100 mm to 1,000 mm. The first, second and/or third wooden element is therefore web-shaped.

The thickness of a first, second and/or third corrugated wooden element is preferably in the range of from 0.2 mm to 2 mm.

The term "thickness" signifies the smallest distance between two surfaces of a corrugated wooden element. These surfaces are spaced apart from one another by the thickness.

In a further embodiment, the height of a first, second and/or third wooden element is in the range of from 0.8 mm to 8 mm.

In one embodiment, first, second and/or third corrugated wooden elements comprise or consist of a veneer or OSB chips.

In a preferred embodiment, the corrugated wooden elements are not zigzag-shaped. In particular, this means that the edge is not a sharp line.

In one embodiment, this core layer can be produced in such a way that the first corrugated wooden element which extends in a first direction is provided, and the second corrugated wooden element which extends in a second direction is applied to the first element, the first direction being different from the second direction.

The core layer is preferably planar.

The corrugated wooden elements preferably comprise or consist of OSB strands or a strand-like material.

Multilayer Composite Comprising a Core Layer as Defined Above

The invention also relates to a multilayer composite comprising the core layer as defined above.

The term "multilayer composite" signifies a composite made of at least one core layer and at least one cover layer.

The term "cover layer" signifies a layer of a material which is preferably used as a support for the core layer. According to the invention, the cover layer is arranged so as to at least partially, preferably completely, cover the core layer and be fixedly connected thereto. The core layer can also be at least partially covered by at least two cover layers and be fixedly connected thereto. The core layer is preferably then located between the two cover layers. The cover layer can consist of wood or comprise wood. Other materials such as sheet metal or plastics can likewise be used.

The term "at least partially cover" includes it being possible for the cover layer to also completely overlap or cover the core layer.

According to the invention, a multilayer composite at least comprises a cover layer and a core layer, wherein the cover layer is arranged so as to at least partially cover the core layer and be fixedly connected thereto, wherein the core layer is a core layer as defined in the first or second aspect.

The cover layer can comprise a material selected from: veneer, wood board, chipboard, fiberboard, plywood board, plastics board, plasterboard, sheet metal, fiber cement board, paper or cardboard, and from two or more thereof.

In one embodiment, the multilayer composite can be produced such that the step (A) defined above is carried out on a cover layer, the other steps (B) and/or (C) then coming after. The multilayer composite can be completed by applying a further cover layer according to step (B) or (C).

The at least one cover layer is preferably flat, i.e. planar.

The at least one cover layer preferably has a quadratic or rectangular shape.

The dimensions of the cover layer are not limited. The width and the length of the at least one cover layer are preferably each in the range of from 0.50 m to 5 m, more preferably in the range of from 1 to 3 m.

In a further embodiment, the cover layer or the cover layers that are connected to the core layer can be produced in situ, provided that the cover layer or the cover layers consist of or comprise OSB strands or a strand-like material.

According to the invention, the method comprises: (A) scattering OSB strands or a strand-like material so as to form a first layer by a scattering device which is designed such that the OSB strands or the strand-like material are randomly arranged in the first layer; (B) applying a second layer to the first layer by scattering corrugated wooden elements by a scattering device which is designed such that the wooden elements can be scattered so as to extend in one direction, wherein the corrugated wooden elements are arranged so as to be oriented such that wave troughs of overlying wooden elements interlock, or such that wave crests of overlying wooden elements interlock, or such that wave troughs of overlying wooden elements interlock and wave crests of overlying wooden elements interlock, and wherein at least some of the wooden elements are arranged in the second layer such that these wooden elements form cavities therebetween; and optionally (C) applying a third layer to the second layer by scattering OSB chips by a scattering device which is designed such that the OSB chips are randomly arranged in the third layer; and (D) compressing the layers formed in steps (A), (B) and the optional step (C), wherein OSB strands or strand-like material and corrugated wooden elements contacting one another can be fixedly interconnected in each case by an adhesive.

The fixed connection is facilitated by applying pressure, the compaction also producing the required homogeneity, the pressure preferably being in a range of from 0.02 MPa to 2.5 MPa, more preferably in a range of from 0.01 to 1.0 MPa.

The OSB strands are adjacent to one another and above one another in a random manner in the layers formed in steps (A) and (C).

Pressure-Deformed Core Layer or
Pressure-Deformed Multilayer Composite

The invention also relates to a core layer and a multilayer composite containing the core layer which are not planar.

In one embodiment, the core layer according to the invention in accordance with the description above and the multilayer composite according to the invention in accordance with the description above can be subjected to a pressure deformation step, whereby it is possible to produce three-dimensional objects. For this purpose, the core layer according to the invention or the multilayer composite according to the invention can be deformed in a suitable pressing tool. This deformation can occur during the production of the core layer or of the multilayer composite, as well as thereafter.

In one embodiment, only the edges of the core layer or of the multilayer composite are deformed, preferably by compressing. In so doing it is possible to seal the cavities at the edges of the core layer or of the multilayer composite. This pressure deformation can be carried out while the core layers or the multilayer composite are being joined together, or also in a subsequent step after the core layers or the multilayer composite have been joined together, for example by thermally softening the adhesive on the edges. This embodiment is advantageous in that sealing the edges, for example by applying a wood strip, preferably a veneer strip, can be dispensed with.

Compressing provides the possibility of providing the edge part of the core layer or of the multilayer composite with a spherical profile, i.e. a rounded profile. This is particularly desirable for example in high-quality furniture components.

In a further embodiment, not only the edge region but also, in addition or separately to the edge region, further regions of the core layer or of the multilayer composite can also be pressure-deformed.

A method for producing three-dimensional wooden objects by pressure deformation is described in German Patent No. DE 101 24 912.

The invention therefore also relates to a deformed core layer which can be produced according to a method that comprises at least the step (X): (X) pressure-deforming the core layer as defined above.

Moreover, the invention also relates to a deformed multilayer composite at least comprising a cover layer and a core layer, wherein the cover layer is arranged so as to at least partially cover the core layer and be fixedly connected thereto, the core layer being a core layer as defined in the first or second aspect; which deformed multilayer composite can be produced according to a method which comprises at least the step (Y): (Y) pressure-deforming the multilayer composite as defined above.

Uses

According to another aspect, the invention also relates to the use of the core layer according to the invention or of the multilayer composite according to the invention which can be deformed or undeformed.

The multilayer composite according to the invention or the core layer according to the invention can preferably be used in applications which facilitate high mechanical stress at relatively low weight, and/or which require a high damping capacity. In one embodiment, the multilayer composite or the core layer is used in the production of furniture, for shelving, for packaging for transport, for interior structures, in doors and gates, in or as chairs, and in the construction of vehicles and ships. For this purpose, the multilayer composite or the core layer can be processed by cutting, sawing, filing and/or drilling according to known methods.

The core layer according to the invention and a multilayer composite which comprises the core layer according to the invention, for example a lightweight building board, have a high compressive strength. In this respect, the core layer according to the invention and the multilayer composite according to the invention produced therefrom are superior to the corresponding core layers or multilayer composites which are produced from industrial waste from chips and fiber boards. In addition, dimensional changes in the core layer or the multilayer composite may be negligible under the influence of moisture, in particular dimensional changes in the direction of the thickness of the core layer or of the multilayer composite, due to the negligible dimensional changes of the wooden elements in the direction of the fibers. This applies in particular if the direction of the fibers extends toward the at least two adjacent laminar regions and perpendicularly with respect to the edges formed by the adjacent regions. This is a further advantage by comparison with other known core layers and multilayer composites produced therefrom, as they are produced for example from flat parts or from layers that are produced so as to have parallel fibers, for example such as plywood board or fiberboard.

Without being bound to one theory, it is assumed that the advantages discussed result from the structure of the corrugated wooden elements used in the core layer and the multilayer composite, said edge preferably not extending in parallel with the direction of the fibers of the wooden element, but instead preferably perpendicularly with respect thereto. The structure of the wooden element is then still supported by the wood fibers, in particular on said edge.

In addition, fastening means such as nails and screws or furniture connectors can find reliable purchase in the core layer according to the invention and the multilayer composite according to the invention, since the structure of the core layer comprises only small cavities, i.e. has a high homogeneity, at a comparatively low density. In so doing, it is also possible to achieve stable fastening to a support, for example to a wall.

The invention therefore also relates to the use of a core layer as defined above; or of a multilayer composite as defined above; or of a pressure-deformed core layer or of a pressure-deformed multilayer composite as defined above; in the production of furniture, for shelving, for packaging for transport, for interior structures, in doors and gates, and in the construction of vehicles and ships.

The invention can also be described as including the following points:

(1) Core layer which comprises at least: a first layer comprising first corrugated wooden elements arranged above one another, wherein the first wooden elements extend in a first direction; and a second layer comprising second corrugated wooden elements arranged above one another, wherein the second wooden elements extend in a second direction; wherein the first and the second layer are arranged above one another and contact one another; wherein first corrugated wooden elements are arranged in the first layer so as to be oriented such that wave troughs of overlying first wooden elements interlock, or such that wave crests of overlying first wooden elements interlock, or such that wave troughs of overlying first wooden elements interlock and wave crests of overlying first wooden elements interlock; wherein second corrugated wooden elements are arranged in the second layer so as to be oriented such that wave troughs of overlying second wooden elements interlock, or such that wave crests of overlying second wooden elements interlock, or such that wave troughs of overlying second wooden elements interlock and wave crests of overlying second wooden elements interlock; wherein the first and the second direction are different from one another.

(2) Core layer according to point 1, the angle between the first direction and the second direction being in the range of from 45 to 135°, the angle preferably being 90°.

(3) Core layer which comprises at least: a first layer comprising first corrugated wooden elements arranged above one another, wherein the first wooden elements extend in a first direction; and a second layer comprising second corrugated wooden elements arranged above one another; wherein the first and the second layer are arranged above one another and contact one another; wherein first corrugated wooden elements are arranged in the first layer so as to be oriented such that wave troughs of overlying first wooden elements interlock, or such that wave crests of overlying first wooden elements interlock, or such that wave troughs of overlying first wooden elements interlock and wave crests of overlying first wooden elements interlock; wherein second corrugated wooden elements are randomly arranged in the second layer.

(4) Core layer according to any of points 1 to 3, comprising a third layer comprising third corrugated wooden elements on top of one another.

(5) Core layer according to point 3 and point 4, wherein the first layer and the third layer surround the second layer in a sandwich-like manner, wherein third corrugated wooden elements extend in the third layer in a third direction, and wherein the third wooden elements are arranged so as to be oriented such that wave troughs of overlying third wooden elements interlock, or such that wave crests of overlying third wooden elements interlock, or such that wave troughs of overlying third wooden elements interlock and wave crests of overlying third wooden elements interlock; wherein the first direction is the same as or is different from the third direction.

(6) Core layer according to point 3 and point 4, wherein the second layer and the third layer surround the first layer in a sandwich-like manner, wherein third corrugated wooden elements are randomly arranged in the third layer.

(7) Core layer according to point 1 or point 2 and point 4, wherein the first and the third layer surround the second layer in a sandwich-like manner, wherein third corrugated wooden elements are randomly arranged in the third layer.

(8) Core layer according to point 1 or point 2 and point 4, wherein the first and the third layer surround the second layer in a sandwich-like manner, wherein third corrugated wooden elements extend in the third layer in a third direction, wherein the third wooden elements are arranged so as to be oriented such that wave troughs of overlying third wooden elements interlock, or such that wave crests of overlying third wooden elements interlock, or such that wave troughs of overlying third wooden elements interlock and wave crests of overlying third wooden elements interlock; wherein the second direction and the third direction are different from one another.

(9) Core layer according to point 8, the angle between the second direction and the third direction being in the range of from 45 to 135°, the angle preferably being 90°.

(10) Core layer according to any of the preceding points, edges that are formed by the wave troughs or the wave crests of first, second and/or third corrugated wooden elements extending in parallel with one another.

(11) Core layer according to any of the preceding points, wherein first, second and/or third corrugated wooden elements comprise fibers having a preferred direction.

(12) Core layer according to point 11, wherein the preferred direction of the fibers is the same as the direction of extension of the first, second and/or third wooden element.

(13) Core layer according to either point 11 or point 12, wherein the edges do not extend in parallel with the preferred direction.

(14) Core layer according to any of points 10 to 13, wherein the edges extend perpendicularly with respect to the preferred direction.

(15) Core layer according to any of the preceding points, first, second and/or third corrugated wooden elements having a slenderness ratio, which is defined as the ratio of the length to the width of the wooden elements, in the range of from 20:1 to 3:1, preferably 20:1 to 4:1.

(16) Core layer according to point 15, the length being in the range of from 30 to 200 mm, preferably 50 to 200 mm, and the width being in the range of from 10 mm to 50 mm.

(17) Core layer according to any of the preceding points, the thickness of a first, second and/or third corrugated wooden element being in the range of from 0.2 mm to 2 mm.

(18) Core layer according to any of the preceding points, the height of a first, second and/or third corrugated wooden element being in the range of from 0.8 mm to 8 mm.

(19) Core layer according to any of the preceding points, first, second and/or third corrugated wooden elements comprising or consisting of a veneer or OSB chips.

(20) Method for producing a core layer according to any of the preceding points, at least comprising the step (A): (A) scattering first corrugated wooden elements so as to form the first layer by a scattering device which is designed such that first corrugated wooden elements are arranged in the first layer so as to be oriented such that wave troughs of different wooden elements interlock, or such that wave crests of different wooden elements interlock, or such that wave troughs of different wooden elements interlock and wave crests of different wooden elements interlock.

(21) Core layer which comprises at least: a first layer comprising a first corrugated wooden element which extends in a first direction; and a second layer comprising a second corrugated wooden element which extends in a second direction; wherein the first and the second layer are arranged above one another and contact one another; wherein the first and the second direction are different from one another.

(22) Core layer according to point 21, edges that are formed by the wave troughs or the wave crests of a first and/or second corrugated wooden element extending in parallel with one another.

(23) Core layer according to either point 21 or point 22, a first and/or second corrugated wooden element comprising fibers having a preferred direction.

(24) Core layer according to point 23, the edges not extending in parallel with the preferred direction.

(25) Core layer according to either point 23 or point 24, the edges extending in parallel with the preferred direction.

(26) Core layer according to any of points 21 to 25, first and/or second corrugated wooden elements having a slenderness ratio, which is defined as the ratio of the length to the width of the wooden elements, in the range of from 20:1 to 2:1.

(27) Core layer according to point 26, the length being in the range of from 200 to 2,000 mm, preferably 500 to 2,000 mm, and the width being in the range of from 100 mm to 1,000 mm.

(28) Core layer according to any of points 21 to 27, the thickness of a first and/or second wooden element being in the range of from 0.2 mm to 2 mm.

(29) Core layer according to any of points 21 to 28, the height of a first and/or second wooden element being in the range of from 0.8 mm to 8 mm.

(30) Core layer according to any of points 21 to 29, first and/or second corrugated wooden elements comprising or consisting of a veneer or OSB strands or a strand-like material.

(31) Multilayer composite at least comprising a cover layer and a core layer, wherein the cover layer is arranged so as to at least partially cover the core layer and be fixedly connected thereto, the core layer being a core layer as defined in any of points 1 to 19; or being a core layer as produced according to point 20; or being a core layer as defined in any of points 21 to 30.

(32) Multilayer composite according to point 31, wherein the cover layer comprises a material selected from: veneer, wood board, chipboard, fiberboard, plywood board, plastics board, plasterboard, sheet metal, fiber cement board, cardboard and paper, and from two or more thereof.

(33) Deformed core layer which can be produced according to a method that comprises at least the step (X): (X) pressure-deforming the core layer according to any of points 1 to 19; or pressure-deforming a core layer produced according to point 20; or pressure-deforming a core layer according to any of points 21 to 30.

(34) Deformed multilayer composite at least comprising a cover layer and a core layer, wherein the cover layer is arranged so as to at least partially cover the core layer and be fixedly connected thereto, which deformed multilayer composite can be produced according to a method that comprises at least the step (Y): (Y) pressure-deforming the multilayer composite according to either point 31 or point 32.

(35) Use of a core layer according to any of points 1 to 19; or of a core layer produced according to point 20; or of a core layer according to any of points 21 to 30; or of a multilayer composite according to either point 31 or point 32; or of a deformed core layer according to point 33; or of a deformed multilayer composite according to point 34; in the production of furniture, for shelving, for packaging for transport, for interior structures, in doors and gates, and in the construction of vehicles and ships.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A core layer which comprises:
   one layer comprising corrugated wooden elements arranged above one another,
   wherein each of the wooden elements in the core layer extends in one same direction and the wooden elements are oriented such that all pairs of adjacent wooden elements in the core layer interlock with one another, the interlock being defined such that wave troughs of overlying wooden elements interlock, or such that wave crests of overlying wooden elements interlock, or such that wave troughs of overlying wooden elements interlock and wave crests of overlying wooden elements interlock; and wherein at least some of the wooden elements are arranged in the layer such that these wooden elements form cavities therebetween.

2. A multilayer composite, comprising:

a cover layer and a core layer, wherein the cover layer is arranged so as to at least partially cover the core layer and be fixedly connected thereto, wherein the core layer is the core layer of claim 1, wherein the cover layer comprises a material selected from: veneer, wood board, chipboard, fiberboard, plywood board, plastics board, plasterboard, sheet metal, fiber cement board, paper or cardboard, and from two or more thereof.

3. A core layer which comprises:

a first layer comprising first corrugated wooden elements arranged above one another, wherein the first wooden elements extend in a first direction; and a second layer comprising second corrugated wooden elements arranged above one another, wherein the second wooden elements extend in a second direction;

wherein the first and the second layer are arranged above one another and contact one another;

wherein first corrugated wooden elements are arranged in the first layer so as to be oriented such that wave troughs of overlying first wooden elements interlock, or such that wave crests of overlying first wooden elements interlock, or such that wave troughs of overlying first wooden elements interlock and wave crests of overlying first wooden elements interlock, and wherein at least some of the first wooden elements are arranged in the first layer such that these wooden elements form cavities therebetween;

wherein second corrugated wooden elements are arranged in the second layer so as to be oriented such that wave troughs of overlying second wooden elements interlock, or such that wave crests of overlying second wooden elements interlock, or such that wave troughs of overlying second wooden elements interlock and wave crests of overlying second wooden elements interlock, and wherein at least some of the second wooden elements are arranged in the second layer such that these wooden elements form cavities therebetween;

wherein the first and the second direction are different from one another.

4. A core layer which comprises:

a first layer comprising first corrugated wooden elements arranged above one another, wherein the first wooden elements extend in a first direction; and a second layer comprising second corrugated wooden elements arranged above one another;

wherein the first and the second layer are arranged above one another and contact one another;

wherein first corrugated wooden elements are arranged in the first layer so as to be oriented such that all pairs of adjacent first corrugated wooden elements in the first layer interlock with one another, the interlock being defined such that wave troughs of overlying first wooden elements interlock, or such that wave crests of overlying first wooden elements interlock, or such that wave troughs of overlying first wooden elements interlock and wave crests of overlying first wooden elements interlock, and wherein at least some of the first wooden elements are arranged in the first layer such that these wooden elements form cavities therebetween;

wherein second corrugated wooden elements are randomly arranged in the second layer in a disordered manner such that none of the second corrugated wooden elements interlock with one another.

5. The core layer of claim 4, further comprising:

a third layer comprising third corrugated wooden elements on top of one another.

6. The core layer of claim 5, wherein the first layer and the third layer surround the second layer in a sandwich-like manner, wherein third corrugated wooden elements extend in the third layer in a third direction, wherein the third wooden elements are arranged so as to be oriented such that wave troughs of overlying third wooden elements interlock, or such that wave crests of overlying third wooden elements interlock, or such that wave troughs of overlying third wooden elements interlock and wave crests of overlying third wooden elements interlock, and wherein at least some of the third wooden elements are arranged in the third layer such that these wooden elements form cavities therebetween; and wherein the first direction is the same as or is different from the third direction.

7. The core layer of claim 5, wherein the second layer and the third layer surround the first layer in a sandwich-like manner, and wherein third corrugated wooden elements are randomly arranged in the third layer.

8. The core layer of claim 5, wherein the first and the third layer surround the second layer in a sandwich-like manner, and wherein third corrugated wooden elements are randomly arranged in the third layer.

9. The core layer of claim 5, wherein the first and the third layer surround the second layer in a sandwich-like manner, wherein third corrugated wooden elements extend in the third layer in a third direction, wherein the third wooden elements are arranged so as to be oriented such that wave troughs of overlying third wooden elements interlock, or such that wave crests of overlying third wooden elements interlock, or such that wave troughs of overlying third wooden elements interlock and wave crests of overlying third wooden elements interlock, and wherein at least some of the third wooden elements are arranged in the third layer such that these wooden elements form cavities therebetween; and wherein the second direction and the third direction are different from one another.

10. The core layer of claim 5, wherein first, second and/or third corrugated wooden elements comprise fibers having a preferred direction.

11. The core layer of claim 10, wherein the preferred direction of the fibers is the same as a direction of extension of the first, second and/or third wooden element.

12. The core layer of claim 11, wherein edges of the first, second and/or third wooden element do not extend in parallel with the preferred direction; or wherein edges of the first, second and/or third wooden element extend perpendicularly with respect to the preferred direction.

13. The core layer of claim 5, wherein corrugated wooden elements comprise or consist of a veneer or oriented strand board strands or a strand-like material.

14. A core layer which comprises:
- a first layer comprising only one first corrugated wooden element which extends in a first direction; and
- a second layer comprising only one second corrugated wooden element which extends in a second direction;
- wherein the first and the second layer are arranged above one another and contact one another;
- wherein the first and the second direction are different from one another; and
- wherein the corrugated wooden elements comprise or consist of oriented strand board strands or a strand-like material.

\* \* \* \* \*